United States Patent
Ko et al.

(10) Patent No.: US 12,204,334 B2
(45) Date of Patent: Jan. 21, 2025

(54) MOBILE ROBOT AND CONTROL METHOD THEREFOR

(71) Applicant: LG ELECTRONICS INC., Seoul (KR)

(72) Inventors: Kyoungsuk Ko, Seoul (KR); Koh Choi, Seoul (KR); Hyungsub Lee, Seoul (KR); Sungwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 584 days.

(21) Appl. No.: 17/427,023

(22) PCT Filed: Jan. 31, 2020

(86) PCT No.: PCT/KR2020/001478
§ 371 (c)(1),
(2) Date: Jul. 29, 2021

(87) PCT Pub. No.: WO2020/159277
PCT Pub. Date: Aug. 6, 2020

(65) Prior Publication Data
US 2022/0121211 A1   Apr. 21, 2022

(30) Foreign Application Priority Data
Jan. 31, 2019 (KR) .................. 10-2019-0012991

(51) Int. Cl.
*G05D 1/02* (2020.01)
*A01D 34/00* (2006.01)
(Continued)

(52) U.S. Cl.
CPC ......... *G05D 1/0214* (2013.01); *A01D 34/008* (2013.01); *A01D 34/00* (2013.01);
(Continued)

(58) Field of Classification Search
CPC .. A01D 34/008; A01D 2101/00; A01D 69/02; G05B 15/02; G05B 2219/45098;
(Continued)

(56) References Cited

U.S. PATENT DOCUMENTS 5,528,888 A * 6/1996 Miyamoto et al. .... A01D 34/82
10,942,510 B2 * 3/2021 Ko ........................ G05D 1/0225
(Continued)

FOREIGN PATENT DOCUMENTS

CN     107249833 A  * 10/2017 ............... A61H 3/00
CN     108844543 A  * 11/2018
(Continued)

OTHER PUBLICATIONS

English translated version of Jiang Ping (CN 108844543A) (Year: 2018).*
(Continued)

*Primary Examiner* — Cuong H Nguyen
(74) *Attorney, Agent, or Firm* — Birch, Stewart, Kolasch & Birch, LLP (57) ABSTRACT

The present specification relates to a mobile robot and a control method therefor, and relates to a mobile robot and a control method therefor, whereby, on the basis of a result of comparing position information measured on the basis of information on the traveling of a main body, with position information measured on the basis of the result of receiving a signal, the mobile robot determines a specific position point, within a traveling area, where a speed limit occurs.

15 Claims, 7 Drawing Sheets

(51) Int. Cl.
*G05D 1/00* (2006.01)
*A01D 69/02* (2006.01)
*A01D 101/00* (2006.01)
*B25J 9/16* (2006.01)
*B25J 19/02* (2006.01)
*G05B 15/02* (2006.01)

(52) U.S. Cl.
CPC .......... *A01D 69/02* (2013.01); *A01D 2101/00* (2013.01); *B25J 9/16* (2013.01); *B25J 19/02* (2013.01); *G05B 15/02* (2013.01); *G05B 2219/45098* (2013.01)

(58) Field of Classification Search
CPC .... G05D 1/0238; G05D 1/028; G05D 1/0044; G05D 1/0214; G05D 2201/0208
USPC ........................ 701/23; 318/568.12
See application file for complete search history.

(56) References Cited

U.S. PATENT DOCUMENTS

| | | | |
|---|---|---|---|
| 11,048,268 B2* | 6/2021 | Ouyang | G01S 15/08 |
| 11,073,827 B2* | 7/2021 | Ko | A01D 34/008 |
| 11,178,811 B2* | 11/2021 | Ko | G05D 1/0219 |
| 11,256,250 B2* | 2/2022 | Kwak | G01S 13/0209 |
| 11,269,355 B2* | 3/2022 | Kwak | B25J 9/1666 |
| 11,432,697 B2* | 9/2022 | Kwak | G05D 1/0289 |
| 11,561,275 B2* | 1/2023 | Ko | B25J 5/007 |
| 2015/0271991 A1* | 10/2015 | Balutis | A01D 34/008 700/264 |
| 2017/0123433 A1* | 5/2017 | Chiappetta | G06F 17/00 |
| 2017/0150676 A1 | 6/2017 | Yamauchi et al. | |
| 2018/0095476 A1 | 4/2018 | Madsen et al. | |
| 2018/0213731 A1 | 8/2018 | Wykman et al. | |
| 2018/0352735 A1 | 12/2018 | Balutis et al. | |
| 2018/0354132 A1* | 12/2018 | Noh | B25J 9/1666 |
| 2019/0011928 A1* | 1/2019 | Ouyang | G05D 1/0212 |
| 2019/0163174 A1* | 5/2019 | Ko | G05D 1/028 |
| 2019/0163175 A1* | 5/2019 | Ko | G05D 1/028 |
| 2020/0081456 A1* | 3/2020 | Kwak | G05D 1/0289 |
| 2022/0111522 A1* | 4/2022 | Ko | G08B 13/2491 |
| 2022/0121211 A1* | 4/2022 | Ko | A01D 34/008 |

FOREIGN PATENT DOCUMENTS

| | | |
|---|---|---|
| KR | 10-2010-0098997 A | 9/2010 |
| KR | 10-1488821 B1 | 2/2015 |
| KR | 10-2015-0125508 A | 11/2015 |
| KR | 10-2016-0100149 A | 8/2016 |
| KR | 10-2018-0085589 A | 7/2018 |

OTHER PUBLICATIONS

Da Mota, Francisco AX, et al. "Localization and navigation for autonomous mobile robots using petri nets in indoor environments." IEEE access 6 (2018): 31665-31676 (Year: 2018).*

Tran, Vu Phi, et al. "Coverage Path Planning With Budget Constraints for Multiple Unmanned Ground Vehicles." IEEE Transactions on Intelligent Transportation Systems (Year: 2023).*

H. Zhang, H. Jin, Z. Liu, Y. Liu, Y. Zhu, J. Zhao, "Real-Time Kinematic Control for Redundant Manipulators in a Time-Varying Environment: Multiple-Dynamic Obstacle Avoidance & Fast Tracking of a Moving Object" in IEEE Trans on Industrial Informatics, vol. 16, No. 1, pp. 28-41, Jan. 2020, doi: 10.1109 (Year: 2020).*

An English version of iRobot CN105899112B—autonomous mobile robot (2016).*

International Search Report and Written Opinion for PCT/KR2020/001478, dated Jul. 17, 2020 (10 pages).

Notice of Allowance for Korean Patent Appl. No. 10-2019-0012991, dated Oct. 26, 2020 (5 pages).

Office Action for Korean Application No. 10-2019-0012991, dated Jul. 9, 2020 (10 pages).

* cited by examiner

MOBILE ROBOT AND CONTROL METHOD THEREFOR

CROSS-REFERENCE TO RELATED APPLICATIONS

This application is the National Stage filing under 35 U.S.C. 371 of International Application No. PCT/KR2020/001478, filed on Jan. 31, 2020, which claims the benefit of earlier filing date and right of priority to Korean Application No. 10-2019-0012991, filed on Jan. 31, 2019, the contents of which are all hereby incorporated by reference herein in their entirety.

BACKGROUND

Technical Field

The present disclosure relates to a mobile robot that autonomously drives in a driving area and a control method thereof.

Background Art

In general, a mobile robot is a device that automatically performs a predetermined operation while driving by itself in a predetermined area without a user's manipulation. The mobile robot senses an obstacle located in the area to perform an operation by moving closer to or away from the obstacle.

Such a mobile robot may include a lawn mower robot that mows the lawn on the ground surface of the area as well as a cleaning robot that performs cleaning while driving in the area. In general, a lawn mower may include a riding type device that mows the lawn or weeds the grass on the ground while moving according to a user's operation when the user rides on the device, and a walk-behind type or hand type device that mows the lawn while moving when user manually pulls or pushes the device. Such a lawn mower is moved by the user's direct manipulation to mow the lawn, so there is an inconvenience in that the user must directly operate the device. Accordingly, a mobile robot-type lawn mower having a means capable of mowing the lawn in a mobile robot is being studied. However, in the case of a lawn mower robot, there is a need to set the area to be moved in advance since it operates outdoors as well as indoors. Specifically, since the outdoors is an open space, unlike the indoors, the designation of the area must be made in advance, and the area must be limited to drive the place where the grass is planted.

As a related art of such a lawn mower, Korean Patent Publication No. 10-2015-0125508 (published date: Nov. 9, 2015) (hereinafter, referred to as Prior Document 1) discloses a technology in which a wire is buried in a place where the grass is planted to set an area in which the lawn mower robot will move so as to allow the mobile robot to be controlled to move in an inner region of the wire. Then, a boundary for the mobile robot is set based on a voltage value induced by the wire. However, this wire method only facilitates the position recognition and driving of a boundary portion of the driving area, but results in limitations in improving the position recognition and driving of a wide driving area within the boundary portion.

In addition, U.S. Patent Publication No. 2017-0150676 (published date: Jun. 1, 2017) (hereinafter, referred to as Prior Document 2) discloses a technology in which a plurality of beacons are installed at a boundary portion of the driving area to allow a robot to determine a relative position with respect to the beacons based on a signal transmitted from the beacons while driving along the boundary, and store coordinate information thereof so as to use the stored information for position determination. In other words, according to the Prior Document 2, signals are transmitted and received to and from the plurality of beacons distributed at the boundary portion of the driving area to set the driving area based on the transmission and reception result, thereby performing accurate driving area/position recognition using relative position information with respect to the plurality of beacons. For this reason, it may be possible to partially improve the limitation of position recognition, which is a limitation of the above Prior Document 1.

On the other hand, in the case of such a mobile robot for mowing the lawn, since it operates outdoors rather than indoors, there are many restrictions on driving. In the case of indoors, the ground is monotonous, and factors such as terrain/objects that affect driving are limited, but in the case of outdoors, there are various factors that affect driving, and the terrain is greatly affected. In particular, there are many points where driving is restricted due to the nature of the outdoor environment in which the grass is planted, and when the robot is located at such a point, there is a concern that a slip state occurs in which the robot's posture is inclined and the driving wheel turns idle. For instance, a slip occurs when located at a terrain with a step difference, a pool with water, an obstacle, etc., and when such a slip occurs, an error may occur in the recognition of the robot's position as well as the driving of the robot, thereby causing difficulty in the overall control of the robot. Moreover, when delayed driving due to such a slip point may be accumulated, errors in area information for the driving area may also be accumulated, thereby making it difficult for the robot to operate on the driving area.

In other words, in the related art, driving and position recognition corresponding to a point where driving is restricted has not been performed, and accordingly, there was a problem in that it is vulnerable to the influence of the point where driving is restricted. In addition, due to the nature of the outdoor environment, it was difficult to accurately determine the point where driving is restricted. Due to these problems, the operation performance of the lawn mower robot that drives in an outdoor environment was inevitably limited.

SUMMARY

The problem to be solved by the present disclosure is to improve the limitations of the related art as described above.

Specifically, an aspect of the present disclosure is to provide a mobile robot capable of determining a specific point where driving is restricted within a driving area to control driving, and a control method thereof.

Furthermore, another aspect of the present disclosure is to provide a mobile robot capable of controlling driving based on a result of determining the specific point to prevent restriction of driving such as slip occurrence, and a control method thereof.

In addition, still another aspect of the present disclosure is to provide a mobile robot capable of accurately determining whether there is the specific point based on a result of analyzing the information of the specific point, and performing appropriate driving control accordingly, and a control method thereof.

In order to solve the foregoing problems, a mobile robot and a control method thereof according to the present disclosure may determine a point where speed is limited within a driving area using a result of receiving information on the driving of a main body and a signal received from a transmitter as a solution means.

Specifically, when there is a difference between position information measured based on information on the driving of the main body and position information measured based on the result of receiving the signal, it is determined that the speed is limited at a specific point to determine the specific point.

In other words, a mobile robot and a control method thereof according to the present disclosure may determine a specific point where speed limit is generated within a driving area based on a result of comparing position information measured based on information on the driving of the main body and position information measured based on the result of receiving the signal as a solution means.

Through such a solution means, a mobile robot and a control method thereof according to the present disclosure may determine a specific point where speed is limited in accordance with a slip occurrence or the like in a driving area to perform driving control according to the determination result, thereby solving the foregoing problems.

The technical features as described above may be implemented by a control means of controlling a mobile robot, a lawn mower robot and a method of controlling the lawn mower robot, and a method of determining and detecting a slip point of the lawn mower robot, and the present specification provides an embodiment of a mobile robot and a control method thereof having the above technical features as a problem solving means.

A mobile robot according to the present disclosure, having the above technical features as a problem solving means, may include a main body, a drive unit that moves the main body, a sensing unit that senses at least one of posture information of the main body and driving information of the drive unit, a receiver that receives signals transmitted from one or more transmitters disposed in a driving area, and a controller that determines a current position of the main body based on at least one of a sensing result of the sensing unit and a reception result of the receiver to control the drive unit to be driven in the driving area so as to control the driving of the main body, wherein the controller determines a specific point where driving is restricted within the driving area based on first position information measured based on the sensing result and second position information measured based on the reception result to control the driving of the main body according to the determination result.

In addition, a method of controlling a mobile robot according to the present disclosure, having the above technical features as a problem solving means, may include a main body, a drive unit that moves the main body, a sensing unit that senses at least one of posture information of the main body and driving information of the drive unit, a receiver that receives signals transmitted from one or more transmitters disposed in a driving area, and a controller that determines a current position of the main body based on at least one of a sensing result of the sensing unit and a reception result of the receiver to control the drive unit to be driven within the driving area so as to control the driving the main body, and the method may include measuring first position information and second position information, respectively, based on a sensing result of the sensing unit and a reception result of the receiver, respectively, while driving, comparing the first position information with the second position information, determining whether it is a specific point where driving is restricted within the driving area at a current position according to the comparison result, and controlling the driving of the main body according to the determination result.

A mobile robot and a control method thereof according to the present disclosure as described above may be applied and implemented to a control means of a lawn mower robot, a lawn mower system, a control system of a lawn mower robot, a method of controlling a lawn mower robot, and a method of determining and detecting a slip point of a lawn mower robot. However, the technology disclosed in this specification may not be limited thereto, and may also be applied and implemented to all robot cleaners, control means of controlling a robot cleaner, robot cleaning systems, methods of controlling a robot cleaner, to which the technical concept of the technology is applicable.

A mobile robot and a control method thereof according to the present disclosure may determine a point where speed is limited within a driving area using a result of receiving information on the driving of a main body and a signal received from a transmitter, thereby having an effect of simply and accurately determining a specific point that affects driving.

Furthermore, a mobile robot and a control method thereof according to the present disclosure may determine the specific point using a result of receiving information on the driving of a main body and a signal received from a transmitter, thereby having an effect of controlling driving according to the specific point.

Accordingly, a mobile robot and a control method thereof according to the present disclosure may have an effect of performing accurate and safe driving in a driving area.

In addition, a mobile robot and a control method thereof according to the present disclosure may control driving according to the specific point, thereby having an effect of preventing the restriction of driving such as a slip occurrence.

Moreover, a mobile robot and a control method thereof according to the present disclosure may analyze the information of the specific point, thereby having an effect of accurately determining whether or not there exists the specific point.

Besides, a mobile robot and a control method thereof according to the present disclosure may accurately determine whether or not there exists the specific point according to a result of analyzing the information of the specific point, thereby having an effect of performing appropriate driving control accordingly.

DETAILED DESCRIPTION

Hereinafter, embodiments of a mobile robot and a control method thereof according to the present disclosure will be described in detail with reference to the accompanying drawings, and the same or similar elements are designated with the same numeral references regardless of the numerals in the drawings and their redundant description will be omitted.

In describing the technology disclosed herein, moreover, the detailed description will be omitted when specific description for publicly known technologies to which the disclosure pertains is judged to obscure the gist of the technology disclosed in the present specification. Also, it should be noted that the accompanying drawings are merely illustrated to easily explain the concept of the technology disclosed in the present specification, and therefore, they should not be construed to limit the concept of the technology by the accompanying drawings.

Hereinafter, an embodiment of a mobile robot (hereinafter, referred to as a robot) according to the present disclosure will be described.

Figure 1A:
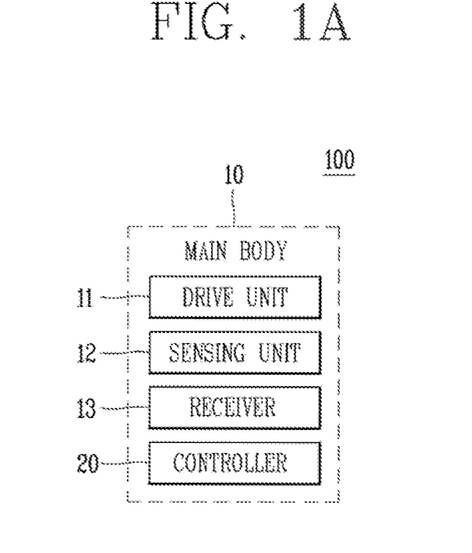
FIG. 1A is a block diagram (a) showing an embodiment of a mobile robot according to the present disclosure.

As illustrated in FIG. 1A, the robot 100 includes a main body 10, a drive unit 11 that moves the main body 10, a sensing unit 12 that senses at least one of the posture information of the main body 10 and the driving information of the drive unit 11, a receiver 13 that receives a signal transmitted from one or more transmitters 200 disposed within a driving area 1000, and a controller 20 that determines a current position of the main body 10 based on at least one sensing result of the sensing unit 12 and a reception result of the receiver 13 to control the drive unit 11 so as to control the driving of the main body 10 to be driven within a driving area 1000.

In other words, in the robot 100, the controller 20 may determine the current position of the main body 10 on the driving area 1000 based on the sensing result of the sensing unit 12 and the reception result of the receiver 13, and control the drive unit 11 to allow the main body 10 to be driven within the driving area 1000, thereby being driven in the driving area 1000.

In this way, in the robot 100 including the main body 10, the drive unit 11, the sensing unit 12, the receiver 13, and the controller 20, the controller 20 determines a specific point where driving is restricted within the driving area 1000 based on first position information measured based on the sensing result and second position information measured based on the reception result to control the driving of the main body 10 according to the determination result.

In other words, in the robot 100, the controller 20 measures the first position information based on the sensing result of the sensing unit 12, and measures the second position information based on the reception result of the receiver 13 to determine the specific point based on the first position information and the second position information.

Figure 1B:
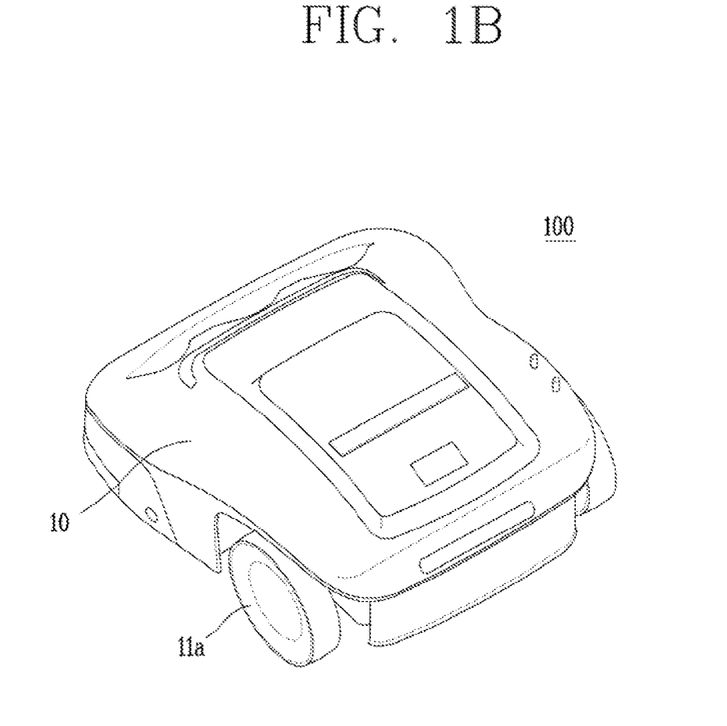
FIG. 1B is a configuration diagram (b) showing an embodiment of a mobile robot according to the present disclosure.
Figure 1C:
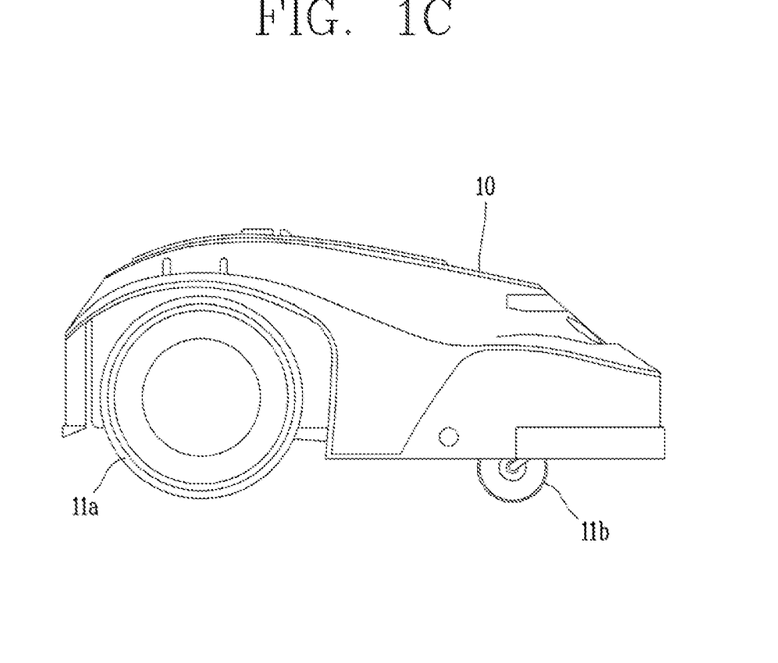
FIG. 1C is a block diagram (c) showing an embodiment of a mobile robot according to the present disclosure.

The robot 100 may be an autonomous driving robot including the main body 10 provided to be movable as shown in FIGS. 1B and 1C to cut the lawn. The main body 10 defines an outer appearance of the robot 100, and is provided with at least one element for performing an operation such as driving of the robot 100 and cutting the lawn. The main body 10 is provided with the drive unit 11 capable of moving and rotating the main body 10 in a desired direction. The drive unit 11 may include a plurality of rotatable driving wheels, and each wheel may be rotated individually to allow the main body 10 to be rotated in a desired direction. More specifically, the drive unit 11 may include at least one main driving wheel 11a and an auxiliary wheel 11b. For example, the main body 10 may include two main driving wheels 11a, and the main driving wheels may be installed on a rear bottom surface of the main body 10.

Figure 2:
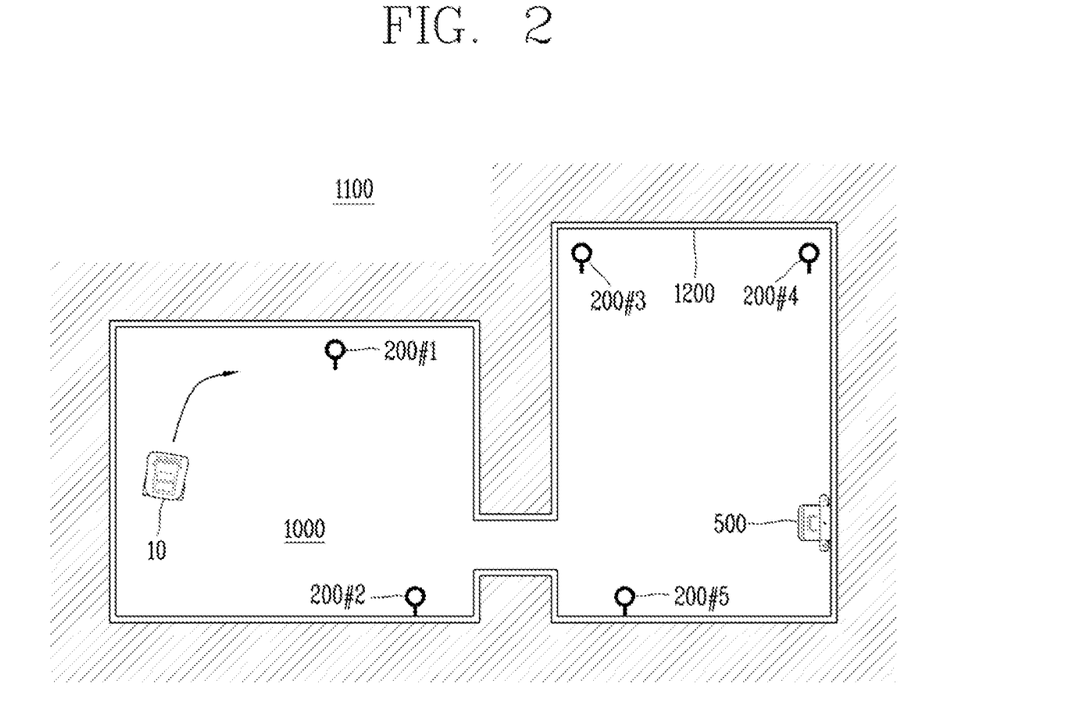
FIG. 2 is a conceptual view showing an embodiment of a driving area of a mobile robot according to the present disclosure.

The robot 100 may drive by itself within the driving area 1000 as illustrated in FIG. 2. The robot 100 may perform a specific operation while driving. Here, the specific operation may be an operation of cutting the lawn in the driving area 1000. The driving area 1000 is an area corresponding to a driving and operating target of the robot 100, and a predetermined outdoor/field area may be defined as the driving area 1000. For instance, a garden, a yard, or the like, for the robot 100 to cut the lawn may be defined as the driving area 1000. A charging device 500 for charging the driving power of the robot 100 may be provided in the driving area 1000, and the robot 100 may be docked to the charging device 500 provided in the driving area 1000 to charge driving power.

The driving area 1000 may be defined as a predetermined boundary area 1200 as illustrated in FIG. 2. The boundary area 1200 may correspond to a boundary line between the driving area 1000 and an outer area 1100, thereby allowing the robot 100 to be driven within the boundary area 1200 so as not to deviate from the outer area 1100. In this case, the boundary area 1200 may be formed as a closed curve or a closed loop. Furthermore, in this case, the boundary area 1200 may be defined by a wire 1200 formed as a closed curve or a closed loop. The wire 1200 may be installed in an arbitrary area, and the robot 100 may drive within the driving area 1000 of a closed curve formed by the installed wire 1200.

In addition, one or more transmitters 200 may be disposed in the driving area 1000 as illustrated in FIG. 2. The transmitter 200 is a signal generating element that transmits a signal for allowing the robot 100 to determine position information, and may be distributed and installed within the driving area 1000. The robot 100 may receive a signal transmitted from the transmitter 200 to determine a current position based on the reception result, or may determine position information on the driving area 1000. In this case, the robot 100 may receive the signal by the receiver 13. The transmitter 200 may be preferably disposed in the vicinity of the boundary area 1200 in the driving area 1000. In this case, the robot 100 may determine the boundary area 1200 based on the placement position of the transmitter 200 disposed in the vicinity of the boundary area 1200.

Figure 3A:
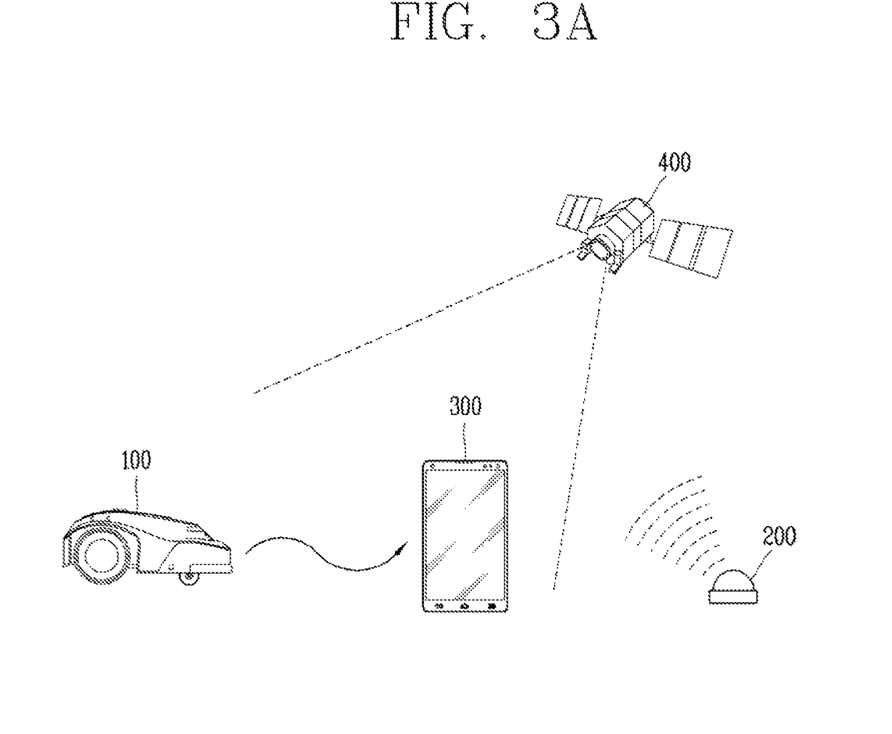
FIG. 3A is a conceptual view showing a driving principle of a mobile robot according to the present disclosure.
Figure 3B:
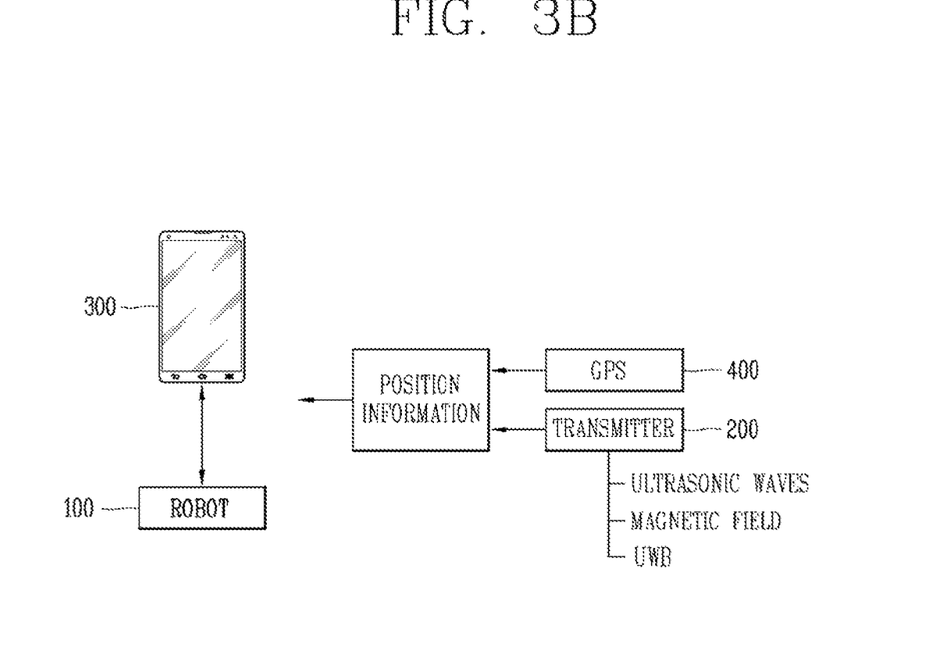
FIG. 3B is a conceptual view showing a signal flow between devices for determining the position of a mobile robot according to the present disclosure.

The robot 100 that cuts the lawn while driving in the driving area 1000 as illustrated in FIG. 2 may operate according to a driving principle as illustrated in FIG. 3A, and signal flow between devices for determining position may be carried out as illustrated in FIG. 3B.

The robot 100 may communicate with a terminal 300 moving in a predetermined area as illustrated in FIG. 3A, and may drive by following the position of the terminal 300 based on data received from the terminal 300. The robot 100 may set a virtual boundary in a predetermined area based on position information received from the terminal 300 or collected while driving by following the terminal 300, and set an inner area defined by the boundary as the driving area 1000. When the boundary area 1200 and the driving area 1000 are set, the robot 100 may drive within the driving area 1000 so as not to deviate from the boundary area 1200. In some cases, the terminal 300 may set the boundary area 1200 and transmit it to the robot 100. When the area is changed or expanded, the terminal 300 may transmit the changed information to the robot 100 to allow the robot 100 to drive in a new area. Furthermore, the terminal 300 may display data received from the robot 100 on a screen to monitor the operation of the robot 100.

The robot 100 or the terminal 300 may receive position information to determine a current position. The robot 100 and the terminal 300 may determine the current position based on position information transmitted from the transmitter 200 disposed in the driving area 1000 or a GPS signal using a GPS satellite 400. The robot 100 and the terminal 300 may preferably receive signals transmitted from the three transmitters 200 and compare the signals to determine the current position. In other words, three or more transmitters 200 may be preferably disposed in the driving area 1000.

The robot 100 sets any one point in the driving area 1000 as a reference position, and then calculates the position during movement as a coordinate. For example, the initial start position, the position of the charging device 500 may be set as a reference position, and furthermore, a coordinate with respect to the driving area 1000 may be calculated using a position of any one of the transmitters 200 as a reference position. In addition, the robot 100 may set an initial position as a reference position during each operation, and then determine the position while driving. The robot 100 may compute a driving distance with respect to the reference position, based on the number of rotations of the drive wheel 11, a rotational speed, and a rotational direction of the main body 10, and determine the current position within the driving area 1000 accordingly. Even in the case of determining position using the GPS satellite 400, the robot 100 may determine the position using any one point as a reference position.

As illustrated in FIG. 3, the robot 100 may determine a current position based on position information transmitted from the transmitter 200 or the GPS satellite 400. The position information may be transmitted in the form of a GPS signal, an ultrasonic signal, an infrared signal, an electromagnetic signal, or an Ultra-Wide Band (UWB) signal. The signal transmitted from the transmitter 200 may be preferably an Ultra-Wide Band (UWB) signal. Accordingly, the robot 100 may receive the UWB (Ultra-Wide Band) signal transmitted from the transmitter 200 to determine the current position based thereon.

Figure 4:
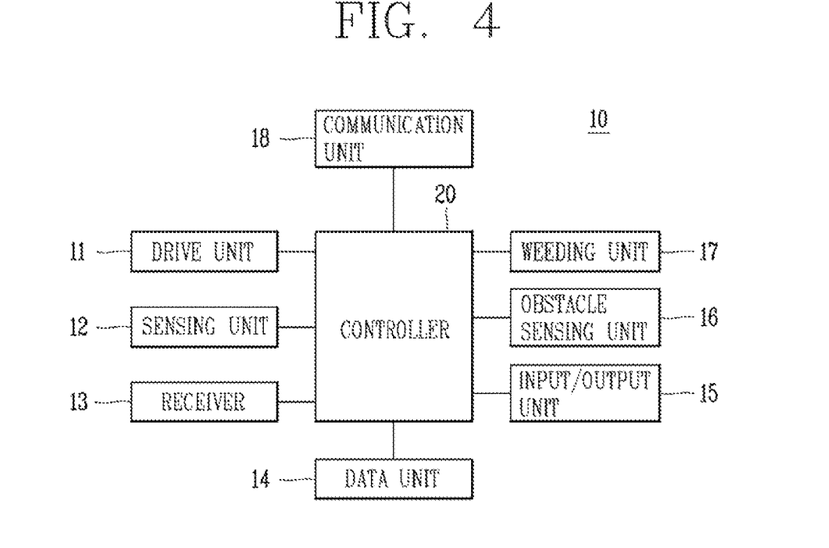
FIG. 4 is a block diagram showing a specific configuration of a mobile robot according to the present disclosure.

The robot 100 operating in this manner, as illustrated in FIG. 4, may include the main body 10, the drive unit 11, the sensing unit 12, the receiver 13, and the controller 20 to determine the specific point where the driving of the main body 10 is restricted within the driving area 1000, and drive in the driving area 1000 according to the determination result. The robot 100 may further include at least one of a data unit 14, an input/output unit 15, an obstacle sensing unit 16, a weeding unit 17, and a communication unit 18.

The drive unit 11, which is a driving wheel provided at a lower portion of the main body 10, may be rotatably driven to move the main body 10. In other words, the drive unit 11 may operate to allow the main body 10 to be driven in the driving area 1000. The drive unit 11 may include at least one drive motor to move the main body 10 to allow the robot 100 to be driven. For instance, the drive unit 11 may include a left wheel drive motor that rotates a left wheel and a right wheel drive motor that rotates a right wheel.

The drive unit 11 may transmit information on a driving result to the controller 20, and receive a control command for an operation from the controller 20. The drive unit 11 may operate according to a control command received from the controller 20. In other words, the drive unit 11 may be controlled by the controller 20.

The sensing unit 12 may include one or more sensors that sense information on the posture and operation of the main body 10. The sensing unit 12 may include at least one of a tilt sensor that senses a movement of the main body 10 and a speed sensor that senses a driving speed of the drive unit 11. The tilt sensor may be a sensor that senses the posture information of the main body 10. When the main body 10 is inclined in a front, rear, left, or right direction, the tilt sensor may calculate an inclined direction and angle thereof to sense the posture information of the main body 10. A tilt sensor, an acceleration sensor, or the like may be used for the tilt sensor, and any of a gyro type, an inertial type, and a silicon semiconductor type may be applied in the case of the acceleration sensor. Moreover, in addition, various sensors or devices capable of sensing the movement of the main body 10 may be used. The speed sensor may be a sensor that senses a driving speed of a driving wheel provided in the drive unit 11. When the driving wheel rotates, the speed sensor may sense the rotation of the driving wheel to detect the driving speed.

The sensing unit 12 may transmit information on a sensing result to the controller 20 and receive a control command for an operation from the controller 20. The sensing unit 12 may operate according to a control command received from the controller 20. In other words, the sensing unit 12 may be controlled by the controller 20.

The receiver 13 may include a plurality of sensor modules for transmitting and receiving position information. The receiver 13 may include a position sensor module that receives the signal from the transmitter 200. The position sensor module may transmit a signal to the transmitter 200. When the transmitter 200 transmits a signal using any one of an ultrasonic wave, UWB (Ultra-Wide Band), and an infrared ray, the receiver 13 may be provided with a sensor module that transmits and receives an ultrasonic, UWB, or infrared signal corresponding thereto. The receiver 13 may preferably include a UWB sensor. For reference, UWB radio technology refers to using a very wide frequency band of several GHz or more in a baseband without using a radio carrier (RE carrier). UWB radio technology uses very narrow pulses of several nanoseconds or several picoseconds. Since the pulses emitted from such a UWB sensor are several nanoseconds or several picoseconds, penetrability is good, and accordingly, very short pulses emitted from other UWB sensors may be received even when there are obstacles around them.

When the robot 100 drives by following the terminal 300, the terminal 300 and the robot 100 may each include a UWB sensor to transmit and receive a UWB signal to and from each other through the UWB sensor. The terminal 300 may transmit a UWB signal through a UWB sensor, and the robot 100 may determine the position of the terminal 300 based on the UWB signal received through the UWB sensor, and move by following the terminal 300. In this case, the terminal 300 operates at a transmitting side, and the robot 100 operates at a receiving side. When the transmitter 200 is provided with a UWB sensor to transmit a signal, the robot 100 or the terminal 300 may receive a signal transmitted from the transmitter 200 through the UWB sensor provided therein. In this case, a signal method of the transmitter 200 and a signal method of the robot 100 and the terminal 300 may be the same or different.

The receiver 13 may include a plurality of UWB sensors. When two UWB sensors are included in the receiver 13, for example, they may be provided at the left and right sides of the main body 10, respectively, to receive signals, thereby comparing a plurality of received signals to calculate an accurate position. For example, when distances measured by the left sensor and the right sensor are different according to the positions of the robot 100 and the transmitter 200 or the terminal 300, a relative position between the robot 100 and the transmitter 200 or the terminal 300 and a direction of the robot 100 may be determined based thereon.

The receiver 13 may further include a GPS module that transmits and receives a GPS signal from the GPS satellite 400.

The receiver 13 may transmit a reception result of the signal to the controller 20, and receive a control command for an operation from the controller 20. The receiver 13 may operate according to a control command received from the controller 20. In other words, the receiver 13 may be controlled by the controller 20.

The data unit 14 may include a hard disk drive (HDD), a solid state disk (SSD), a silicon disk drive (SDD), a ROM, RAM, CD-ROM, a magnetic tape, a floppy disk, and an optical data storage device as a storage element for storing data that can be read by a microprocessor. In the data unit 14, a received signal may be stored, reference data for determining an obstacle may be stored, and obstacle information on the sensed obstacle may be stored. In addition, control data for controlling the operation of the robot 100, data according to the operation mode of the robot 100, position information to be collected, information on the driving area 1000 and a boundary 1200 thereof may be stored in the data unit 14.

The input/output unit 15 may include an input element such as at least one button, a switch, and a touch pad, and an output element such as a display module and a speaker to receive a user command and output an operation state of the robot 100.

The input/output unit 15 may transfer information on an operation state to the controller 20, and receive a control command for an operation from the controller 20. The input/output unit 15 may operate according to a control command received from the controller 20. In other words, the input/output unit 15 may be controlled by the controller 20.

The obstacle sensing unit 16 includes a plurality of sensors to sense an obstacle existing in a driving direction. The obstacle sensing unit 16 may sense an obstacle in front of the main body 10, that is, in a driving direction, using at least one of a laser, an ultrasonic wave, an infrared ray, and a 3D sensor. The obstacle sensing unit 16 may further include a cliff detection sensor provided on a rear surface of the main body 10 to sense a cliff.

The obstacle sensing unit 16 may also include a camera that photographs the front side to sense an obstacle. The camera, which is a digital camera, may include an image sensor (not shown) and an image processing unit (not shown). The image sensor, which is a device that converts an optical image into an electrical signal, is composed of a chip in which a plurality of photo diodes are integrated, and a pixel is exemplified as a photo diode. Charges are accumulated in each of the pixels by an image formed on the chip by light passing through a lens, and the charges accumulated in the pixels are converted into an electrical signal (e.g., voltage). As an image sensor, CCD (Charge Coupled Device), CMOS (Complementary Metal Oxide Semiconductor), or the like are well known. Furthermore, the camera may include an image processing unit (DSP) that processes the photographed image.

The obstacle sensing unit 16 may transmit information on a sensing result to the controller 20 and receive a control command for an operation from the controller 20. The obstacle sensing unit 16 may operate according to a control command received from the controller 20. In other words, the obstacle sensing unit 16 may be controlled by the controller 20.

The weeding unit 17 mows the lawn on the ground surface while driving. The weeding unit 17 may be provided with a brush or blade for mowing the lawn to mow the lawn on the bottom through rotation.

The weeding unit 17 may transmit information on an operation result to the controller 20 and receive a control command for an operation from the controller 20. The weeding unit 17 may operate according to a control command received from the controller 20. In other words, the weeding unit 17 may be controlled by the controller 20.

The communication unit 18 may communicate with the transmitter 200 and the terminal 300 in a wireless communication manner. The communication unit 18 may also be connected to a predetermined network to communicate with an external server or the terminal 300 controlling the robot 100. When communicating with the terminal 300, the communication unit 18 may transmit the generated map to the terminal 300, receive a command from the terminal 300, and transmit data on the operation state of the robot 100 to the terminal 300. The communication unit 18 may include a communication module such as Wi-Fi and WiBro, as well as short-range wireless communication such as ZigBee and Bluetooth to transmit and receive data.

The communication unit 18 may transmit information on a communication result to the controller 20, and receive a control command for an operation from the controller 20. The communication unit 18 may operate according to a control command received from the controller 20. In other words, the communication unit 18 may be controlled by the controller 20.

The controller 20 may include a central processing unit to perform overall operation control of the robot 100. The controller 20 may determine a specific point where the driving of the main body 10 is restricted in the driving area 1000 through the main body 10, the drive unit 11, the sensing unit 12 and the receiver 13 to control the robot 100 to be driven according to the determination result, and control the function/operation of the robot 100 to be performed through the data unit 14, the input/output unit 15, the obstacle sensing unit 16, the weeding unit 17, and the communication unit 18.

The controller 20 may control the input/output of data, and control the drive unit 11 to allow the main body 10 to be driven according to a setting. The controller 20 may control the drive unit 11 to independently control the operation of the left wheel drive motor and the right wheel drive motor, thereby controlling the main body 10 to drive in a straight or rotating manner.

The controller 20 may set the boundary 1200 for the driving area 1000 based on position information received from the terminal 300 or position information determined based on a signal received from the transmitter 200. The controller 20 may also set the boundary 1200 for the driving area 1000 based on position information collected by itself while driving. The controller 20 may set any one of areas formed by the set boundary 1200 as the driving area 1000. The controller 20 may connect discontinuous position information with a line or a curve to set the boundary 1200 in a closed loop shape, and set an inner area as the driving area 1000. When the driving area 1000 and the boundary 1200 according thereto are set, the controller 20 may control the driving of the main body 10 to be driven within the driving area 1000 so as not to deviate from the set boundary 1200. The controller 20 may determine a current position based on the received position information, and control the drive unit 11 to allow the determined current position to be located within the driving area 1000 so as to control the driving of the main body 10.

In addition, the controller 20 may control the driving of the main body 10 to be driven by avoiding an obstacle according to obstacle information received by the obstacle sensing unit 16. In this case, the controller 20 may modify the driving area 1000 by reflecting the obstacle information on area information previously stored for the driving area 1000.

In the robot 100 configured as illustrated in FIG. 4, the controller 20 may determine a current position of the main body 10 based on at least one of a sensing result of the sensing unit 12 and a reception result of the receiver 13, and control the drive unit 11 to allow the main body 10 to be driven within the driving area 1000 according to the determined position, thereby being driven in the driving area 1000.

Figure 5:
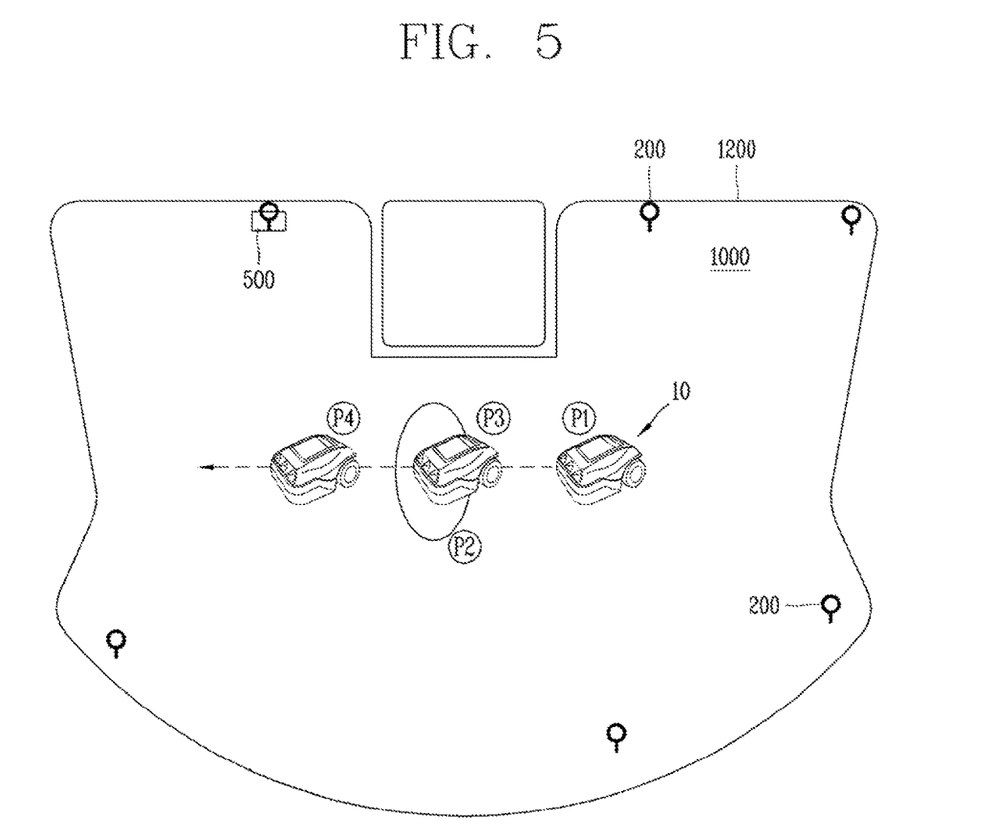
FIG. 5 is an exemplary view showing an embodiment of determining a specific point in a mobile robot according to the present disclosure.

As illustrated in FIG. 5, the robot 100 may perform a set operation while driving in the driving area 1000. For instance, when driving in the driving area 1000, the robot 100 may cut the lawn existing on a bottom surface of the driving area 1000.

In the robot 100, the main body 10 may be driven through the driving of the drive unit 11. The main body 10 may be driven by operating the drive unit 11 to move the main body 10.

In the robot 100, the drive unit 11 may move the main body 10 through the driving of driving wheels. The drive unit 11 may move the main body 10 by the driving of the driving wheels, thereby perform the driving of the main body 10.

In the robot 100, the sensing unit 12 may sense at least one of the posture information of the main body 10 and the driving information of the drive unit 11 while driving. Here, the posture information may be information on a change in the orientation of the main body 10. For example, it may include information on a z-axis angle with respect to a vertical direction of the main body 10. The driving information may be information on the rotation of the drive unit 11. For instance, it may include information on at least one of the number of rotations, a rotation speed, and a rotation direction of the drive unit 11. In other words, the driving information may serve as a basis for measuring a distance moved by the main body 10, and the robot 100 may determine the current position of the main body 10 based on the driving information capable of measuring a driving distance of the main body 10 as described above. For example, when the main body 10 drives from point (P1) to point (P3), the robot 100 may measure a distance driven by the main body 10 based on driving information while the main body 10 is driving from point (P1) to point (P3), and determines that the main body 10 moves from point (P1) to point (P3) based on the measured distance, thereby determining the current position of the main body 10.

In the robot 100, the receiver 13 may receive a signal transmitted from one or more transmitters 200 disposed in the driving area 1000 while driving. Here, the transmitters 200 may be distributively disposed in the driving area 1000, and preferably, at least three transmitters may be distributively disposed. The receiver 13 may receive the signal transmitted from each of the transmitters 200 while the main body 10 is driving in the driving area 1000. In other words, the receiver 13 may receive signals from the plurality of transmitters 200, respectively, and receive a plurality of signals. The receiver 13 may receive the signal in real time while the main body 10 is driving in the driving area 1000. In other words, the transmitter 200 may transmit the signal in real time, and the receiver 13 may receive the signal in real time while driving to receive the signal whenever the position changes according to the driving. Here, the signal transmitted from each of the transmitters 200 may be transmitted in a predetermined form. In addition, since the signal is transmitted at a position where the transmitter 200 is disposed, that is, a fixed position, the reception sensitivity of the signal may vary depending on the position of the main body 10. In other words, the signal may have a reception result that varies depending on a position at which the signal is received, and the robot 100 may determine the current position of the main body 10 based on the signal whose reception result varies according to the reception position. For example, when the main body 10 drives from point (P1) to point (P3), the robot 100 may measure a distance to each of the transmitter 200 based on a reception result while the main body 10 is driving from point (P1) to point (P3), and determines that the main body 10 moves from point (P1) to point (P3) based on the measured distance, thereby determining the current position of the main body 10.

In the robot 100, the controller 20 may determine the current position of the main body 10 based on at least one of a sensing result of the sensing unit 12 and a reception result of the receiver 13 while driving, thereby controlling the drive unit 11 to drive within the driving area 1000 to control the driving of the main body 10. The controller 20 may measure a distance driven by the main body 10 based on the sensing result, thereby determining the current position of the main body 10 based on the measured distance. The controller 20 may measure a placement position of the transmitter 200 and a distance between the main body 10 and the transmitter 200 based on the reception result, thereby determining the current position of the main body based on the measured distance. The controller 20 may also determine the current position of the main body 10 based on the sensing result and the reception result. The controller 20 may control the driving of the drive unit 11 to allow the main body 10 to be driven within the driving area 1000 according to the determined current position. In other words, the controller 20 may control the driving of the drive unit 11 not to allow the driving position of the main body 10 to deviate from the boundary area 1200 according to the determined current position, thereby controlling the driving of the main body 10. The controller 20 may also control the operation of the main body 10 to allow the main body 10 to perform a set operation.

The controller 20 may control the driving of the main body 10 as described above, and determine a specific point where driving is restricted within the driving area 1000 based on first position information measured based on the sensing result and second position information measured based on the reception it result, thereby controlling the driving of the main body 10 according to the determination result. In other words, the robot 100 determines the specific point on the driving area 1000 based on the first position information and the second position information, and drives in the driving area 1000 according to the determination result. The process of allowing the controller 20 to determine the specific point may be performed in the order illustrated in FIG. 6.

Figure 6:
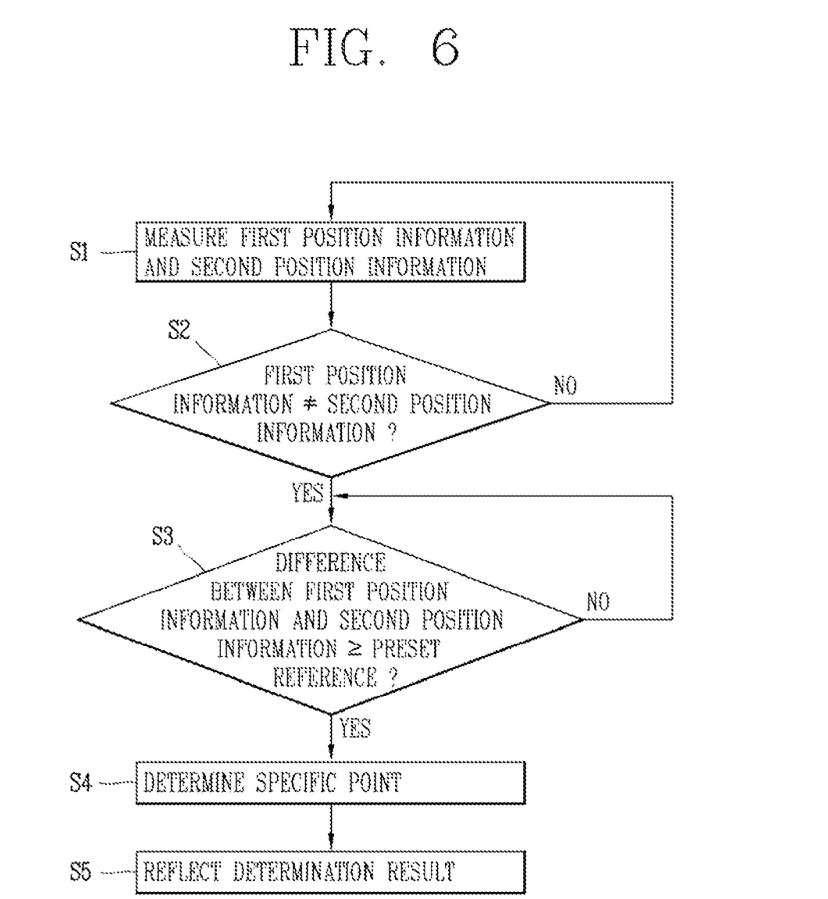
FIG. 6 is a flowchart showing a process of determining a specific point in a mobile robot according to the present disclosure.

The controller 20 may measure each of the first position information and the second position information (S1) based on the sensing result and the reception result, respectively, while driving in the driving area 1000. For instance, when the main body 10 is driving from point (P1) to point (P4), the sensing unit 12 may sense at least one of the posture information and the driving information while driving from point (P1) to point (P4), and the receiving unit (13) may receive the signal transmitted from at least one transmitter 200 to measure the first position information based on the sensing result, and measure the second position information based on the reception result. In this case, the controller 20 may calculate a driving distance that the main body 10 has moved based on the sensing result, and measure the first position information based on the driving distance. The controller 20 may also detect a placement position where each of the transmitters 200 is disposed on the driving area 1000 based on the reception result, and measure the second position information based the placement position and a resultant distance between the main body 10 and the placement position.

After measuring the first position information and the second position information, the controller 20 may compare the first position information with the second position information (S2) while driving, and determine the specific point according to the comparison result (S3 and S4). The controller 20 may compare the first position information with the second position information (S2) to determine whether the first position information matches the second position information. When the first position information and the second position information are not matched as a result of comparing the first position information with the second position information (S2), the controller 20 may determine a difference between the first position information and the second position information (S3), and determine a position corresponding to the first and second position information as the current position of the main body 10 when the first position information matches the second position information. As a result of determining a difference between the first position information and the second position information (S3), the controller 20 may determine a position corresponding to the second position information as the specific point (S4) when the difference between the first position information and the second position information is above a preset reference.

More specifically describing the determination of the specific point, when a slip occurs due to a terrain at point (P3) while the main body 10 is driving from point (P1) to point (P4), the current position according to the sensing result may be determined to correspond to point (P4) since the driving unit 11 is continuously driven though the actual position of the main body 10 corresponds to point (P2-P3) due to the slip. Accordingly, the current position may be determined inaccurately according to the first position information. On the contrary, in the case of determining the current position based on the reception result, the current position may be determined by receiving the signal according to the actual position of the main body 10, and thus the current position of the main body 10 may be determined to correspond to point (P2-P3), thereby determining the exact current position of the main body 10. In other words, when driving is restricted due to a slip occurrence or the like while driving, the first position information may be determined to correspond to point (P4), and the determination of the current position may be made inaccurately, and the second position information may be determined to correspond to point (P2-P3), thereby accurately determining the current position. Accordingly, when the first position information and the second position information do not match, and a difference between the first position information and the second position information is above the preset reference, the second position It may be determined that driving restriction such as a slip or the like has occurred at a point corresponding to the second position information to determine the point corresponding to the second position information as the specific point.

As a result of determining a difference between the first position information and the second position information (S3), the controller 20 may determine that the position corresponding to the second position information is not the specific point when the difference between the first position information and the second position information is less than the preset reference, thereby continuously determining the difference between the first position information and the second position information (S3). In other words, when the difference between the first position information and the second position information is less than the preset reference, the controller 20 may determine that the difference between the first position information and the second position information is caused by a temporary factor, not a factor that restricts driving, thereby determining that the specific point has not occurred. In this case, the controller 20 may maintain the driving control of the main body 10, and repeatedly maintain the determination (S3) of the difference between the first position information and the second position information until the difference between the first position information and the second position information becomes above the preset reference, that is, until determining the specific point.

Subsequent to determining the specific point (S4), the controller 20 may control the driving of the main body 10 according to the determination result. For instance, when determining the specific point (S4), the driving of the main body 10 may be controlled by reflecting the determination result (S5) so as to drive by avoiding the specific point. When determining the specific point (S4), the controller 20 may analyze the information of the specific point based on the determination result, and determine whether to avoid the specific point according to the analysis result, thereby controlling the driving of the main body according to the determination result (S5). In other words, the controller 20 may analyze the information of the specific point based on the determination result, and reflect the analyzed information of the specific point on the driving control of the main body 10 (S5), thereby controlling the driving of the main body 10.

In this way, when determining the specific point, the controller 20 that determines the specific point, may analyze the information of the specific point based on the determination result, and determine whether to avoid the specific point according to the analysis result, thereby controlling the driving of the main body 10 according to the determination result.

The controller 20 may analyze the type of the specific point based on the determination result and history information on previous determination history, and control the driving of the main body 10 according to the type of the specific point. For instance, the type of the specific point may be analyzed based on the determination result and at least one of the occurrence frequency and cause of the specific point included in the history information. As a result of analyzing the type of the specific point, the controller 20 may control the driving of the main body to be driven by avoiding the specific point when the type of the specific point corresponds to a preset first reference type. In other words, the controller 20 may analyze the type of the specific point based on the determination result and the history information, and control the driving of the main body 10 to be driven by avoiding the specific point when the type of the specific point corresponds to a specific type reference as a result of the analysis. Here, the first reference type may be a permanent driving restriction point. As a result of analyzing the type of the specific point, when the type of the specific point corresponds to a preset second reference type, the controller 20 may control the driving of the main body 10 to be driven by passing through or bypassing the specific point. Here, the second reference type may be at least one of a time-limited driving restriction point and a temporary driving restriction point. In other words, the controller 20 may analyze the type of the specific point and control the main body 10 to be driven by any one of avoiding, bypassing, or passing through the specific point according to the type of the specific point. For example, the controller 20 may analyze the occurrence frequency of the specific point and whether the specific point has occurred permanently, for a limited time or temporarily based on the determined history of the specific point, and determine whether the specific point is a permanent driving restriction point due to an obstacle, a terrain, or the ground, a time-limited driving restriction point due to the influence of the weather, or a temporary driving restriction point due to a user's manipulation or the like, thereby controlling the driving of the main body 10 to be driven by avoiding the specific point and drive. For instance, when the specific point is a permanent driving restriction point, the controller 20 may control the main body 10 to be driven by avoiding the specific point, and when the specific point is a temporary driving restriction point, the controller 20 may determine whether it is possible to remove the driving restriction of the specific point, and control the main body 10 to be driven by passing through or bypassing the specific point according the determination result.

Figure 7A:
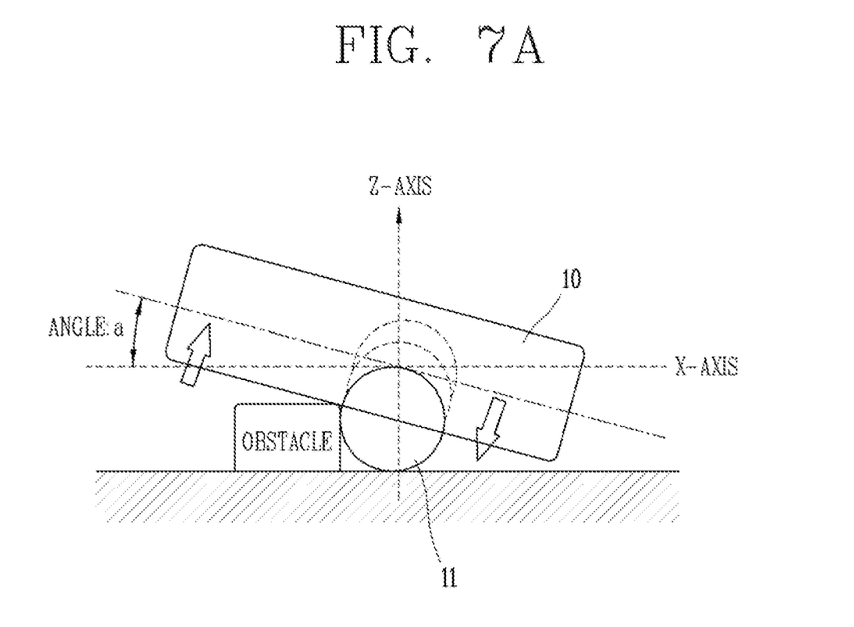
FIGS. 7A and 7B are a conceptual view showing a principle of determining the terrain of a specific point in a mobile robot according to the present disclosure.
Figure 7B:
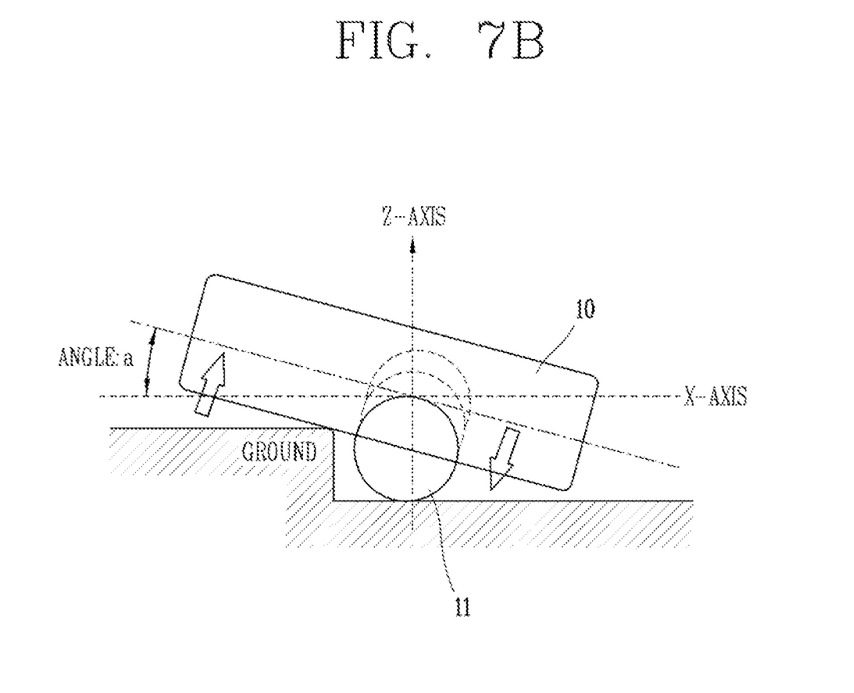

The controller 20 may analyze the terrain of the specific point based on the determination result and the posture information, and control the driving of the main body 10 according to the terrain of the specific point. For instance, the terrain of the specific point may be analyzed based on a result of comparing the posture information with a preset posture reference. As a result of analyzing the terrain of the specific point, when the terrain of the specific point corresponds to a preset first reference terrain, the controller 20 may control the driving of the main body 10 to be driven by avoiding the specific point. In other words, the controller 20 may analyze the terrain of the specific point based on the determination result and the posture information, and control the driving of the main body 10 to be driven by avoiding the specific point when the terrain of the specific point corresponds to a specific terrain criterion as a result of the analysis. When the terrain of the specific point corresponds to a preset second reference terrain, the controller 20 may control the driving of the main body 10 to be driven by passing through or bypassing the specific point. When the terrain at the specific point corresponds to the second reference terrain, the controller 20 may determine whether it is possible to remove the driving restriction of the specific point, and control the driving of the main body 10 to be driven by bypassing or passing through the specific point according to the determination result. For example, as illustrated in FIGS. 7A and 7B, the controller 20 may analyze the z-axis angle of the main body 10 based on the posture information at the specific point, and determine the terrain structure of the specific point based on the z-axis angle, and accordingly control the driving of the main body 10 to be driven by avoiding the specific point. For instance, when the z-axis angle is above a predetermined reference, the controller 20 may control the main body 10 to be driven by avoiding the specific point, and when the z-axis angle is less than the predetermined reference, the controller 20 may determine whether it is possible to remove the driving restriction of the specific point, and control the main body 10 to be driven by passing through or bypassing the specific point according the the determination result.

Subsequent to determining the specific point (S4), the controller 20 may store the determination result and reflect it in the driving control of the main body 10 (S5). For instance, when determining the specific point (S4), the determination result may be reflected on the map information of the driving area 1000 (S5), which is a basis for driving control of the main body 10, to control the driving of the main body 10. Here, the map information, which is information previously stored in the controller 20, may be generated and updated based on at least one of the sensing result and the reception result. The controller 20 may control the main body 10 to be driven within the driving area 1000 based on the previously stored map information, and reflect the determination result on the map information, thereby controlling the driving of the main body 10 according to the reflected result. The controller 20 may also store the determination result as historical information on the determination history. Accordingly, when the main body 10 is subsequently controlled, the driving of the main body 10 may be controlled based on the history information.

The robot 100 as described above may be implemented by applying a control method of the lawn mower robot (hereinafter referred to as a control method) to be described below.

The control method is a method for controlling the lawn mower robot 100 as illustrated in FIGS. 1A to 1C, and may be applicable to the robot 100 described above.

The control method, which is a method of controlling the robot 100 including the main body 10, the drive unit 11 that moves the main body 10, the sensing unit 12 that senses at least one of the posture information of the main body 10 and the driving information of the drive unit 11, the receiver 13 that receives a signal transmitted from one or more transmitters 200 disposed within the driving area 1000, and the controller 20 that determines a current position of the main body 10 based on at least one the sensing result and the reception result to control the drive unit 11 so as to control the driving of the main body 10 to be driven within the driving area 1000, may be a method of determining the specific point to control driving.

The control method may be a control method performed by the controller 20.

Figure 8:
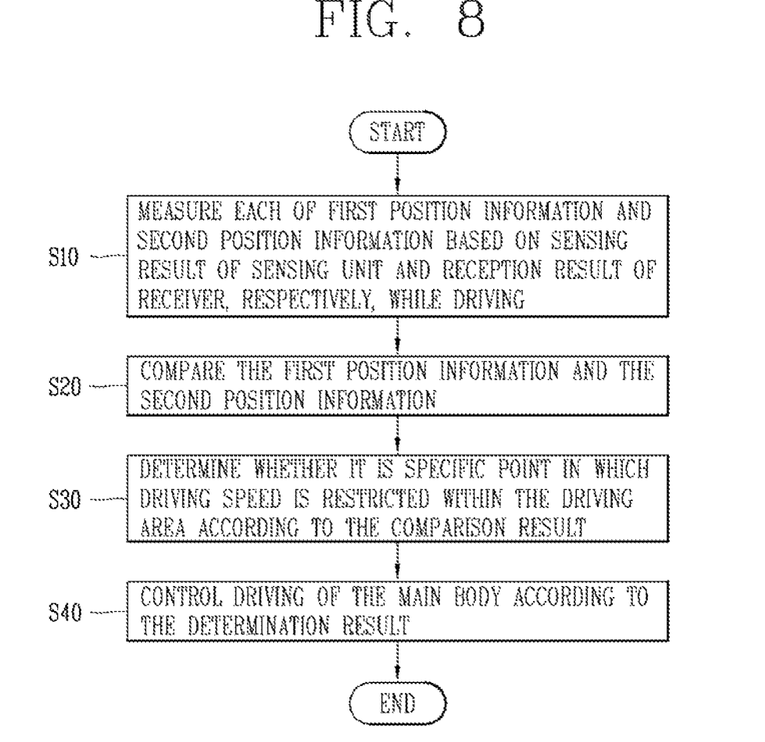
FIG. 8 is a flowchart showing the sequence of a control method of a specific point in a mobile robot according to the present disclosure.

The control method, as illustrated in FIG. 8, includes measuring each of first position information and second position information based on a sensing result of the sensing unit 12 and a reception result of the receiver 13 while driving (S10), comparing the first position information with the second position information (S20), determining whether or not it is a specific point where driving is restricted within the driving area 1000 at a current position according to the comparison result (S30), and controlling the driving of the main body 10 according to the determination result (S40).

In other words, the robot 100 may be controlled in the order of the measuring step (S10), the comparing step (S20), the determining step (S30), and the controlling step (S40).

The measuring step (S10) may measure the first position information based on a result of sensing at least one of the posture information of the main body 10 and the driving information of the drive unit 11 by the sensing unit 12 while driving, and measure the second position information based on a result of receiving signals transmitted from one or more transmitters 200 by the receiver 13 while driving.

The measuring step (S10) may measure a distance driven by the main body 10 based on the sensing result, thereby determining the current position of the main body 10 based on the measured distance.

The measuring step (S10) may also measure a placement position of the transmitter 200 and a distance between the main body 10 and the transmitter 200 based on the reception result, thereby determining the current position of the main body based on the measured distance.

The measuring step (S10) may also determine the current position of the main body 10 based on the sensing result and the reception result.

The comparing step (S20) may compare the first position information with the second position information subsequent to measuring the first position information and the second position information in the measuring step (S10).

The comparing step (S20) may determine whether the first position information matches the second position information.

The determining step (S30) may determine the specific point according to the comparison result of the comparing step (S20).

As a result of the comparison, when the first position information and the second position information do not match, the determining step (S30) may determine a difference between the first position information and the second position information to determine the specific point according to the determination result.

As a result of determining a difference between the first position information and the second position information, the determining step (S30) may determine a position corresponding to the second position information as the specific point when the difference between the first position information and the second position information is above a preset reference.

As a result of determining a difference between the first position information and the second position information, the determining step (S30) may determine that the position corresponding to the second position information is not the specific point when the difference between the first position information and the second position information is less than the preset reference.

As a result of the comparison, when the first position information and the second position information match, the determining step (S30) may determine a position corresponding to the first and second position information as a current position of the main body 10.

The controlling step (S40) may control the driving of the main body 10 according to the determination result of the determining step (S30).

As a result of the determination, when determining the specific point, the controlling step (S40) may analyze the information of the specific point based on the determination result, and determine whether to avoid the specific point according to the analysis result, thereby controlling the driving of the main body according to the determination result.

The controlling step (S40) may analyze the type of the specific point based on the determination result and history information on previous determination history, and control the driving of the main body 10 according to the analysis result.

The controlling step (S40) may analyze the type of the specific point based on the determination result and the history information, and control the driving of the main body 10 to be driven by avoiding the specific point when the type of the specific point corresponds to a specific type reference as a result of the analysis.

The controlling step (S40) may analyze the terrain of the specific point based on the determination result and the posture information, and control the driving of the main body 10 according to a result of analysis.

The controlling step (S40) may analyze the terrain of the specific point based on the determination result and the posture information, and control the driving of the main body 10 to be driven by avoiding the specific point when the type of the specific point corresponds to a specific terrain reference as a result of the analysis.

The controlling step (S40) may also store the determination result to reflect it on the driving control of the main body 10.

The controlling step (S40) may also store the determination result as history information on the determination history.

The control method including the measuring step (S10), the comparing step (S20), the determining step (S30), and the controlling step (S40) may be implemented as codes readable by a computer on a medium written by the program. The computer readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may include the controller 20.

A mobile robot, a mobile robot system, and a control method of a mobile robot system according to the present disclosure as described above may be applied and implemented to a control means of a mobile robot, a mobile robot system, a control system of a mobile robot, a method of controlling a mobile robot, an area monitoring method of a mobile robot, an area monitoring and control method of a mobile robot, and the like. In particular, the present disclosure may be usefully applied and implemented to a lawn mower robot, a control system of a lawn mower robot, a method of controlling a lawn mower robot, a method of sensing a position change of a lawn mower robot, a method of updating an area map of a lawn mower robot, and the like. However, the technology disclosed in this specification will not be limited thereto, and will be applied and implemented to all mobile robots, control means of controlling a mobile robot, mobile robot systems, methods of controlling a mobile robot, and the like, to which the technical concept of the technology is applicable.

Although a specific embodiment according to the present disclosure has been described so far, various modifications may be made thereto without departing from the scope of the present disclosure. Therefore, the scope of the present disclosure should not be limited to the described embodiments and should be defined by the claims to be described later as well as the claims and equivalents thereto.

Although the present disclosure has been described with respect to specific embodiments and drawings, the present disclosure is not limited to those embodiments, and it will be apparent to those skilled in the art that various changes and modifications can be made from the description disclosed herein. Accordingly, the concept of the present disclosure should be construed in accordance with the appended claims, and all the same and equivalent changes will fall into the scope of the present disclosure.

What is claimed is:

1. A mobile robot, comprising:
   a main body;
   a drive unit that moves the main body;
   a sensing unit that senses at least one of posture information of the main body and driving information of the drive unit;
   a receiver that receives signals transmitted from one or more transmitters disposed in a driving area; and
   a controller that determines a current position of the main body based on at least one of a sensing result of the sensing unit and a reception result of the receiver to control the drive unit to be driven in the driving area so as to control the driving of the main body,
   wherein the controller determines a specific point where driving is restricted within the driving area based on first position information measured based on the sensing result and second position information measured based on the reception result to control the driving of the main body according to the determination result,
   wherein the specific point is a point where driving speed of the mobile robot is limited,
   wherein the point comprises a slip occurrence point,
   wherein the first position information and the second position information are information that measures the current position of the main body,
   wherein the controller detects a placement position where one of the one or more transmitters is disposed based on the reception result, and measures the second position information based on the placement position,
   wherein when determining the specific point, the controller analyzes information of the specific point based on the determination result, and determines whether to avoid the specific point according to the analysis result to control the driving of the main body according to the determination result,
   wherein the controller analyzes a type of the specific point based on the determination result and history information on previous determination history to control the driving of the main body according to the type of the specific point, and
   wherein as a result of analyzing the type of the specific point, when the type of the specific point corresponds to a preset second reference type, the controller determines whether it is possible to remove a driving restriction of the specific point, and controls the driving of the main body to be driven by bypassing or passing through the specific point according to the determination result.

2. The mobile robot of claim 1, wherein the sensing unit comprises:
   a tilt sensor that senses the posture information of the main body; and
   a speed sensor that senses a driving speed of a driving wheel provided in the drive unit.

3. The mobile robot of claim 1, wherein the controller calculates a driving distance that the main body has moved based on the sensing result, and measures the first position information based on the driving distance.

4. The mobile robot of claim 1, wherein when determining the specific point, the controller reflects the determination result on map information of the driving area, which is a basis for driving control of the main body.

5. The mobile robot of claim 1, wherein the controller compares the first position information with the second position information while driving to determine the specific point according to the comparison result.

6. The mobile robot of claim 5, wherein as a result of comparing the first position information and the second position information, when a difference between the first position information and the second position information is above a preset reference, the controller determines a position corresponding to the second position information as the specific point.

7. The mobile robot of claim 1, wherein the controller analyzes a terrain of the specific point based on the determination result and the posture information to control the driving of the main body according to the terrain of the specific point.

8. The mobile robot of claim 7, wherein the controller analyzes the terrain of the specific point based on a result of comparing the posture information with a preset posture reference.

9. The mobile robot of claim 1, wherein the controller analyzes the type of the specific point based on the determination result and at least one of an occurrence frequency and cause of the specific point included in the history information.

10. The mobile robot of claim 9, wherein as a result of analyzing the type of the specific point, the controller controls the driving of the main body to be driven by avoiding the specific point when the type of the specific point corresponds to a preset first reference type.

11. The mobile robot of claim 10, wherein the first reference type is a permanent driving restriction point.

12. The mobile robot of claim 8, wherein as a result of analyzing the terrain of the specific point, the controller controls the driving of the main body to be driven by avoiding the specific point when the terrain of the specific point corresponds to a preset first reference terrain, and controls the driving of the main body to be driven by passing through or bypassing the specific point when the terrain of the specific point corresponds to a preset second reference terrain.

13. The mobile robot of claim 9, wherein the second reference type is at least one of a time-limited driving restriction point and a temporary driving restriction point.

14. The mobile robot of claim 12, wherein when the terrain of the specific point corresponds to the second reference terrain, the controller determines whether it is possible to remove the driving restriction of the specific point, and control the driving of the main body to be driven by passing through or bypassing the specific point according to the determination result.

15. A method of controlling a mobile robot, the mobile robot including:
    a main body;
    a drive unit that moves the main body;

a sensing unit that senses at least one of posture information of the main body and driving information of the drive unit;
a receiver that receives signals transmitted from one or more transmitters disposed in a driving area; and
a controller that determines a current position of the main body based on at least one of a sensing result of the sensing unit and a reception result of the receiver to control the drive unit to be driven within the driving area so as to control the driving of the main body,
the method comprising:
measuring first position information and second position information, respectively, based on a sensing result of the sensing unit and a reception result of the receiver, respectively, while driving;
comparing the first position information with the second position information;
determining whether it is a specific point where driving is restricted within the driving area at the current position according to the comparison result; and
controlling the driving of the main body according to the determination result,
wherein the specific point is a point where driving speed of the mobile robot is limited,
wherein the point comprises a slip occurrence point,
wherein the first position information and the second position information are information that measures the current position of the main body,
wherein the measuring comprises:
detecting a placement position where one of the one or more transmitters is disposed based on the reception result, and
measuring the second position information based on the placement position, and wherein the determining comprises:
analyzing a type of the specific point based on the determination result and history information on previous determination history, and
determining whether the mobile robot avoids the specific point in driving the driving area according to an analysis result.

* * * * *